United States Patent [19]

Addison et al.

[11] 4,248,260
[45] Feb. 3, 1981

[54] CONTROL DEVICE FOR CENTER PIVOT IRRIGATION UNITS

[76] Inventors: Carl E. Addison, Gray County, Kans.; Rocky J. Comes, Offerle, Kans. 67563

[21] Appl. No.: 935,620

[22] Filed: Aug. 21, 1978

[51] Int. Cl.³ .............................................. B05B 3/00
[52] U.S. Cl. .................................... 137/899; 239/177; 91/36; 91/39; 91/171
[58] Field of Search .......................... 137/344, 624.13; 239/177, 212, 213; 91/36, 24, 39, 171, 515, 35

[56] References Cited

U.S. PATENT DOCUMENTS

| | | | |
|---|---|---|---|
| 2,470,566 | 5/1949 | MacConnel, Jr. | 137/624.13 |
| 2,674,231 | 4/1954 | Erickson | 91/39 |
| 2,796,789 | 6/1957 | Rice et al. | 91/36 |
| 2,893,643 | 7/1959 | Gordon | 137/344 |
| 3,053,053 | 9/1962 | Douglas | 91/171 |
| 3,606,161 | 9/1971 | Paul | 137/344 |
| 3,608,826 | 9/1971 | Reinke | 239/177 |
| 3,664,232 | 5/1972 | Dvirka | 91/36 |
| 3,703,990 | 11/1972 | Erickson | 137/344 X |
| 3,750,953 | 8/1973 | Reinke | 239/177 |
| 3,760,688 | 9/1973 | Dummer | 91/515 |
| 3,805,896 | 4/1974 | Bauer | 91/39 |
| 3,842,943 | 10/1974 | Nakamura et al. | 91/454 |
| 3,937,237 | 2/1976 | Boone et al. | 137/344 X |
| 3,979,062 | 9/1976 | Christensen et al. | 239/177 X |
| 3,991,578 | 11/1976 | Cooke et al. | 91/36 |
| 4,005,731 | 2/1977 | Townsend | 137/344 |
| 4,036,436 | 7/1977 | Standal | 137/344 X |
| 4,135,539 | 1/1979 | Hunter et al. | 137/344 |

*Primary Examiner*—Martin P. Schwadron
*Assistant Examiner*—A. Michael Chambers
*Attorney, Agent, or Firm*—Fishburn, Gold & Litman

[57] ABSTRACT

A control device is designed for center pivot irrigation units of the type having an elongate water carrying pipe with a plurality of support vehicles spaced therealong, and wherein each of the vehicles includes a double acting hydraulic cylinder mounted thereon for moving the vehicle and the water pipe over the ground. The irrigation unit includes a device for aligning the vehicles, a hydraulic pump with pressure and return lines, and power and retract manifolds respectively interconnecting power and retract sides of the cylinders. The control device includes a hydraulic valve with three positions which communicate the pressure line with the power manifold, the retract manifold, and the pump return line respectively. A timer is operably connected with the valve and regularly sequences the same through a repeating cycle, whereby between the application of pressurized hydraulic fluid to each of the cylinder sides, the control device places the system in a neutral position, in which the hydraulic fluid flows substantially unrestricted through the system for reduced energy consumption, lower fluid temperature, and an extended operating life.

10 Claims, 4 Drawing Figures

CONTROL DEVICE FOR CENTER PIVOT IRRIGATION UNITS

BACKGROUND OF THE INVENTION

This invention relates to center pivot irrigation systems, and in particular to a control device therefor.

Pivot type sprinklers are used widely in semi-arid regions for irrigation of large agricultural areas. Such sprinklers include an elongate water pipe having one end pivotally mounted at a source of water, such as a well, and are supported above the ground by a plurality of spaced apart vehicles. Each of the vehicles includes a motor for moving the water pipe over the ground.

These center pivot sprinkler systems require a substantial amount of power during operation due to the extreme weight of the water in the line, as well as irregularities in the field over which the sprinkler vehicles traverse. Some pivot sprinkler systems are water driven, and use the water pressure in the irrigation pipe to operate the vehicle motors, which are typically cylinders. The pressure required to properly operate the cylinders is very high, and consequently, high pressure water must be supplied along the entire length of the water pipe, thereby requiring high pressure pumps, water lines, and other equipment, as well as requiring substantial energy consumption.

Pivot sprinkler systems are alternatively powered by a separate hydraulic drive, such that the water pressure in the water line may be reduced substantially without adversely effecting the power of the support vehicles. Again, the operating pressure required to properly activate the hydraulic cylinders is quite high, and the hydraulic drive units are therefor susceptible to overheating which breaks down the hydraulic fluid, reduces operating efficiency, and often causes damages to the sprinkler equipment, such as the pumps, seals, manifolds, and the like. Heretofore, the drive units for the center pivots sprinkler systems have not proven to be both efficient and dependable.

Another cause of sprinkler malfunction relates to the extreme misalignment of the sprinkler vehicles. A variety of devices are available for maintaining the sprinkler vehicles in alignment as they are driven. However, such devices are typically quite complex and expensive, and when used in combination with the hydraulic drive type of unit, permit the hydraulic cylinders to operate with lost motion or to short stroke when the vehicle wheels encounter high resistance, such as large rocks, heavy mud, or the like. This lost motion can cause severe misalignment of the sprinkler vehicles, and activate an automatic misalignment shut-off, or cause substantial damage to the sprinkler system.

Repair to the sprinkler system as a result of the damage caused by any one of the above noted problems is not only time consuming and expensive, but may result in complete crop failure if the system is not brought to an operative condition within a relatively short period of time.

SUMMARY OF THE INVENTION

The principal objects of the present invention are: to provide a dependable control device for center pivot irrigation units; to provide such a device having a hydraulic drive valve with a neutral position for reduced energy consumption, lower fluid temperature, and extended operating life; to provide such a device having a timer for regularly sequencing the valve through a repeating cycle; to provide such a device wherein the timer is adjustable to vary the duration of the valve neutral position for controlling the sweep speed of the irrigation system over the ground; to provide such a device wherein the power and retract valve positions are maintained by the timer for a predetermined period to fully extend each of the cylinders; to provide such a device including a check valve for alleviating incomplete stroking of the cylinders; to provide such a device in kit form which is easily connected to an existing center pivot irrigation system; and to provide such a device which is economical to manufacture, efficient in use, capable of a long operating life, and particularly well adapted for the proposed use.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENTS

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention and virtually any appropriately detailed structure.

Figure 1:
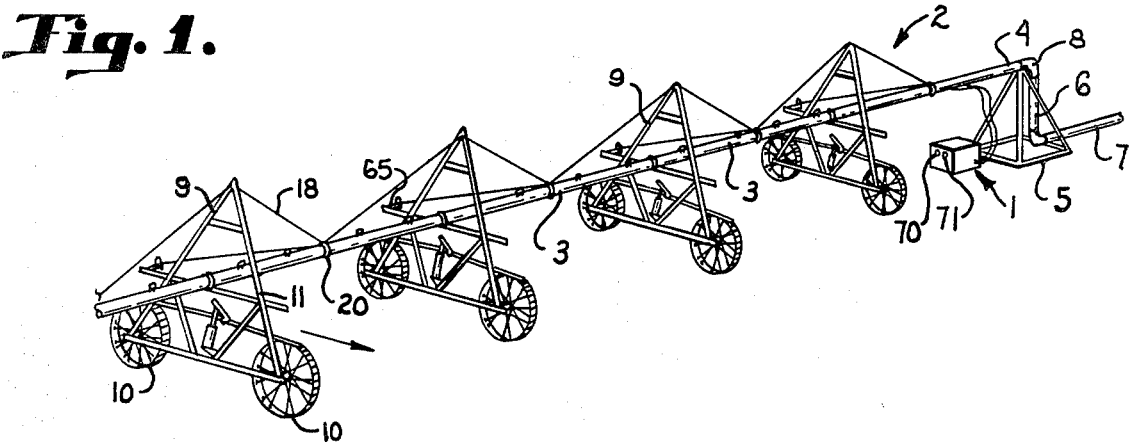
FIG. 1 is a schematic, perspective view of a hydraulic driven center pivot irrigation system, and a control device therefor.
Figure 2:
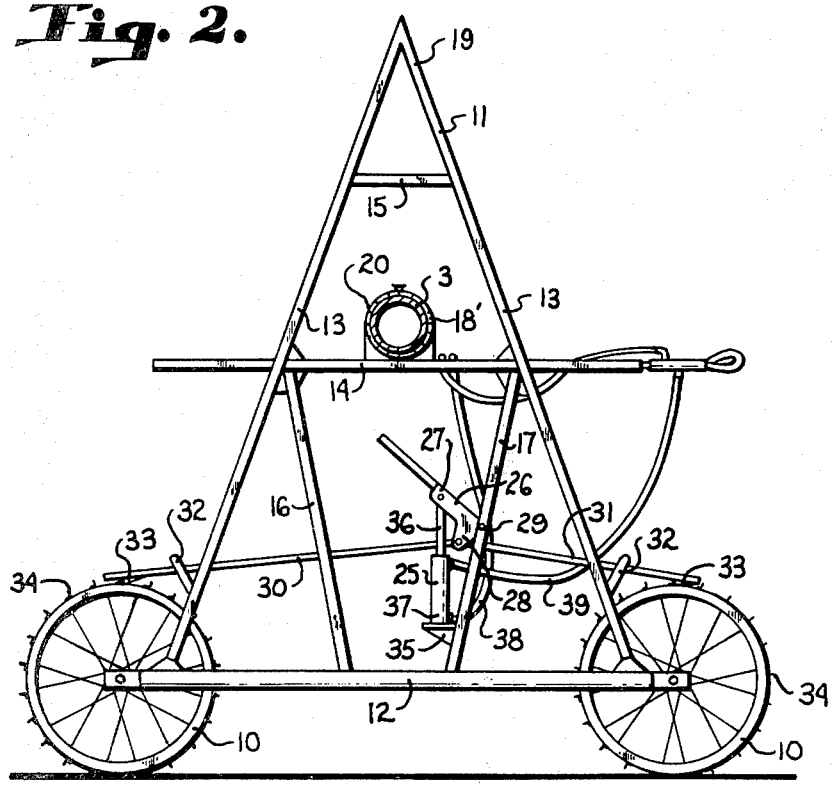
FIG. 2 is a vertical cross-sectional view of the system and control device, particularly showing a support vehicle.

For purposes of description herein, the terms "upper," "lower," "right," "left," "rear," "front," "vertical," "horizontal," and derivatives thereof shall relate to the invention as oriented in FIGS. 1 and 2, however, it is to be understood that the invention may assume various alternative orientations, except where expressly specified to the contrary.

The reference numeral 1 generally designates a control device employing the present invention for a center pivot irrigation system 2. The irrigation system is of the type which includes elongate water carrying pipe 3 having the inner end 4 thereof pivotally attached to a source of pressurized water, such as a well, a water main, or the like, and in the illustrated example, includes a support stand 5, and a vertically oriented section 6 innerconnecting a water main 7 with a pivot joint 8. The water pipe 3 is supported above the ground by a plurality of vehicles 9 which are spaced regularly along the length of the pipe. Each of the vehicles 9 includes a pair of ground engaging wheels 10 and a frame 11 which innerconnects the wheels with the water pipe 3. In the illustrated structure, the vehicle frames 11 have a triangular shape and include a base member 12, side members 13, a horizontal water line support member 14, an upper brace 15, and a pair of inclined lower supports 16 and 17. The lower supports 16 and 17 extend between the base member 12 and the side members 13 and are connected with the water line support member 14 to rigidly support the same. A U-shaped bracket 18' securely attaches the water pipe 3 to a medial portion of the support member 14. The illustrated vehicles include support cables 18 having one end thereof attached to an apex portion 19 of the frame, and the other end attached to that portion of the water pipe extending between adjacent vehicles, at a central collared portion 20 thereof to provide additional support to the water line and prevent the same from sagging.

Each of the vehicles 9 includes a double acting hydraulic cylinder 25 which is mounted thereon, and provides means for moving the vehicle over the ground. A power transmission assembly is provided to transmit the cylinder reciprocation into rotation of the wheels 10, and in the illustrated example comprises an L-shaped bracket 26 having first and second arms 27 and 28, and an end portion 29 pivotally attached to the frame brace 17. The free end of the bracket arm 28 is pivotally attached to a pair of transversely, opposingly extending drive arms 30 and 31, and each arm has the free end thereof positioned over an associated one of the ground engaging wheels 10. The drive arms 30 and 31 are threaded through and retained in a guide 32, and the free ends of the arms include a pawl 33 which is shaped to mate with and engage a plurality of lugs 34 which are attached to the outer periphery of the wheels in a circumferencially spaced manner, in the nature of a ratchet. A support bracket 35 is attached to a lower portion of the frame support 17, and attaches one end of the cylinder 25 to the vehicle frame 11. The other end of the cylinder 25 is pivotally attached to the bracket arm 27 adjacent the free end thereof. Preferably, the shaft portion 36 of the cylinder piston is attached to the bracket arm 27, whereby the cylinder base 37 and the associated hydraulic fluid lines 38 and 39 are stationary during cylinder extension and retraction. As viewed in FIG. 2, extension of the cylinder 25 rotates the bracket 26 about pivot 29 in a clockwise direction, thereby translating the drive arms 30 and 31 in a left-hand direction. Both of the pawls 33 engage an uppermost one of the lugs 34, and translation of the drive arms rotates the wheels 10 with respect to the frame 11 and moves the vehicle 9 over the ground. Retraction of the cylinder 25 causes the bracket 26 to rotate in a counterclockwise direction (as viewed in FIG. 2), thereby translating the drive arms 30 and 31 in a right hand direction and engaging the pawls 33 with the next wheel lug 34.

Each of the cylinders 25 includes a power side 43 (FIG. 4) positioned opposite the piston shaft 36, and a retract side 44. The power and retract sides of the cylinder are respectively connected with the hydraulic fluid lines 38 and 39. In this example, a power manifold 45 interconnects the power side of each of the cylinders, and a retract manifold 46 interconnects the retract side of each of the cylinders. The illustrated manifolds 45 and 46 extend parallel and adjacent to the water pipe 3 and are attached thereto. A hydraulic pump 47 is provided and includes a pressure line 48 and a return line 49.

The control device 1 includes a hydraulic valve 53 having three positions. A first valve position communicates the pump pressure line 48 with the power manifold 45, and the pump return line 49 with the retract manifold 46. A second valve position reverses the interconnection from the first valve position, and communicates the pump pressure line 48 with the retract manifold 46, and the pump return line 49 with the power manifold 45. The third valve position directly communicates the pump pressure line 48 with the pump return line 49. The control device 1 further includes a timer 54 operably connected with the valve 53 and regularly sequencing the valve through a repeating cycle comprising, in seriatum, the first position, the third position, the second position, and the third position, whereby between the application of pressurized hydraulic fluid to each of the cylinder sides 43 and 44, the control device places the system in a neutral position, wherein the hydraulic fluid flows substantially unrestricted therethrough for reduced energy consumption, lower fluid temperature, and extending operating life.

Figure 4:
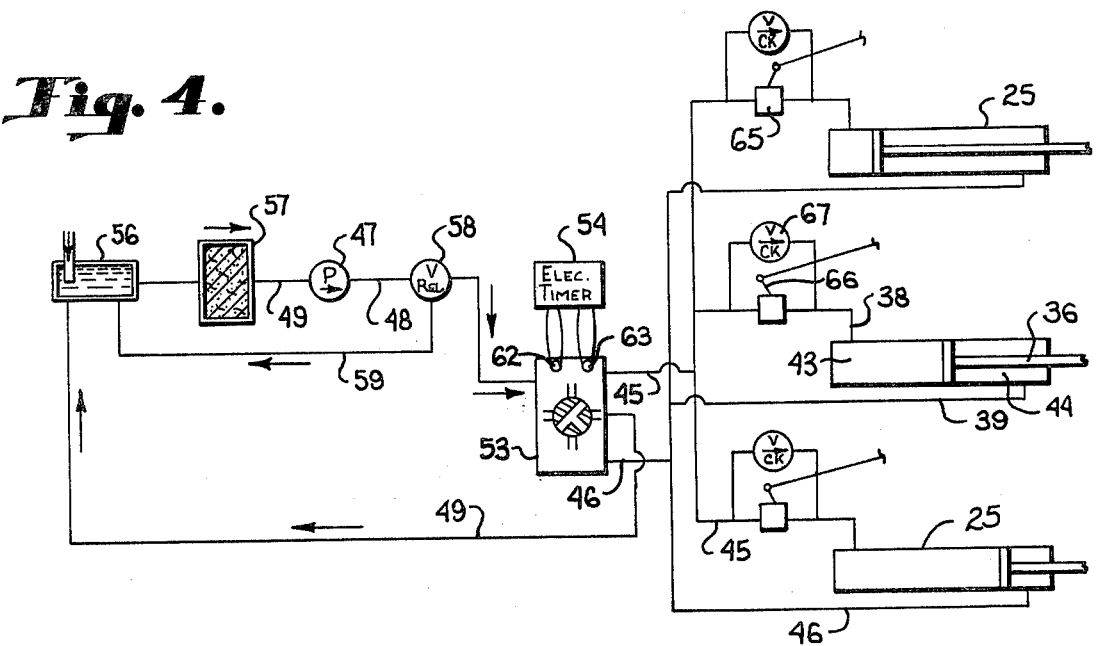
FIG. 4 is a schematic illustration of the control device.

As best shown in FIG. 4, the illustrated system includes a closed, hydraulic fluid reservoir 56, a filter 57, and a relief valve 58 connected between the high pressure side of the pump 47 and the reservoir 56, and communicates hydraulic fluid over a preselected pressure therebetween through conduit 59. The valve 53 is a solenoid operated spool valve which includes resilient means which automatically positions the same in a central position corresponding to the valve third position and communicates the pressure line 48 directly with the return line 49 upon deactivation of the solenoid. The reservoir 56, filter 57, pump 47, relief valve 58, valve 53, and timer 54 are preferably assembled in a self-contained unit 60 which is positioned and anchored adjacent to the pivot support stand 5.

The illustrated timer 54 is an electrical timer which includes a pair of coils 62 and 63 for activating the valve 53. The timer selectively applies current to the coils 62 and 63, thereby manipulating the spool valve 53 into the first and second positions respectively. When neither of the coils are activated, the valve automatically returns to the third position. The timer includes a first adjustment mechanism, such as a rheostat, which varies the time period the valve is permitted to assume the third position so as to control the sweep speed of the irrigation system over the ground. The timer also includes a second adjustment mechanism which varies the time period the valve assumes the first and second positions, and is preferably independent of the first timer adjustment mechanism.

Figure 3:
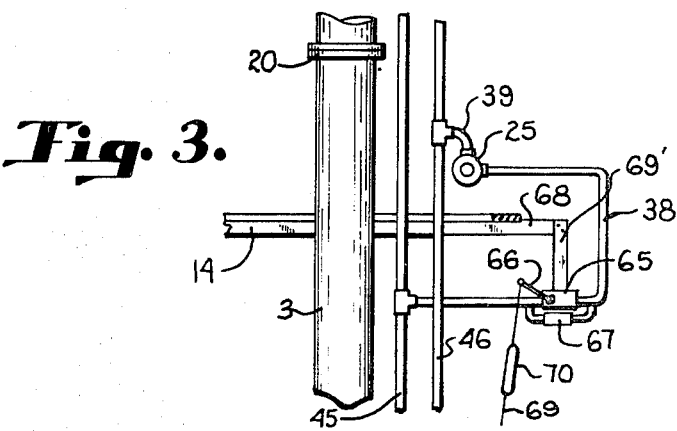
FIG. 3 is a fragmentary, partially schematic, top plan view of the vehicle, particularly showing a drive cylinder and a control valve therefor.

Because the water pipe rotates in a circle, each of the vehicles must move at a different linear rate or speed. The center pivot irrigation system 2 includes a device for aligning the vehicles 9 to prevent damage to the water pipe 3. To accomplish alignment, each of the illustrated cylinders 25 includes a shut-off valve 65 connected between the power side 43 of the cylinder and the power manifold 45, and controls the flow of hydraulic fluid therebetween. The shut-off valve 65 includes a controller spool which opens and closes a mating valve port, and is manipulated by means such as the illustrated spring loaded lever arm 66. The shut-off valve 65 has a normally closed position. A check valve 67 is also connected between the power side 43 of the cylinder and the power manifold 45 in a parallel relationship with the shut-off valve 65. The check valve 67 permits fluid flow from the power manifold 45 to the cylinder side 43 and prevents fluid flow in the opposite direction. As best illustrated in FIG. 3, the shut-off and check valve 65 and 67 are attached to the vehicle frame 5 at an outwardly extending portion 68 of the water line support 14 by a bracket 69'. The valves 65 and 67 are positioned on the trailing side of the frames, defined herein as that portion thereof oriented opposite the direction of water line rotation. The shut-off valve 65 is spaced laterally a predetermined distance from the water pipe 3 for purposes hereinafter described. A flexible cable 69 has one end thereof attached to the valve lever arm 66, and the other end attached to a portion of the water pipe 3 extending between the vehicle to which the valve is attached, and the next, radially inwardly positioned vehicle, thereby establishing an angular relationship between the water pipe 3 and the line 69. As the rotation of the vehicle falls behind that of the next inwardly vehicle, the flexible line 69 is tensed and pulls the valve lever arm 66 into an open position, thereby allowing hydraulic fluid to flow therethrough. After the vehicle has assumed an aligned position with the other vehicles, the tension in the line 69 is relaxed, and the valve lever arm 66 is returned to its closed position. Preferably, an adjustment means, such as the illustrated turnbuckle 70 is provided in the line to adjust pretension therein.

Water driven center irrigation systems may be converted to an arrangement having a separate hydraulic drive and a control device 1, as contemplated by present invention. A kit for making such a conversion includes a plurality of double acting hydraulic cylinders 25, one cylinder for each vehicle, and each cylinder being shaped for connection with the vehicle frame. Power and retract manifolds are provided to interconnect the power side and the retract side of each of the cylinders respectively, and a hydraulic pump is attached to the manifolds. The hydraulic valve 53 and the timer 54 are interconnected with the system in the above described manner. The kit may further include a shut-off valve 65 and a check valve 67 for each of the cylinders 25, as described above, to prevent incomplete or short stroking of the cylinders and consequent vehicle misalignment.

In use, each of the vehicles must travel at a different linear rate of speed about the pivot 8 to maintain the water pipe in a preselected orientation. Although the illustrated water pipe 3 is shown in a straight, aligned orientation, it is to be understood that the same may be arranged in any variety of orientations, such as curves, or the like, so as to accommodate a particular terrain. The timer adjustment associated with the first and second valve positions is varied in accordance with the length of the water pipe by manipulation of a control knob 70, such that hydraulic pressure will be applied by the pump 47 to the power manifold 45 for a period of time sufficient to fully extend each and every one of the cylinders 25 to their fully extended position, whether the shut-off valve 65 is open or closed. The hydraulic pressure and time required to fully extend each of the cylinders varies in accordance with the number of vehicles which are moved during the particular cylinder cycle, however, an average pressure and time may be established for each system. For example, it has been determined that an irrigation system having an average length and vehicle placement, with a pump output pressure of 1,000 PSI requires approximately 3 to 6 seconds to fully extend each of the cylinders. The user would then adjust the timer to a time period of approximately six to eight seconds. After each of the cylinders required to move is fully extended, the relief valve 58 will direct the hydraulic fluid from the high pressure side 48 of the pump back into the reservoir 56 for the remaining period. Preferably the time period for dumping the fluid into the reservoir after full cylinder extension is minimized for efficient operation. In the illustrated example, the duration of the power and retract cycles is the same, and is adjusted simultaneously. Next, the adjustment associated with the third or neutral valve position mechanism of the timer is varied by manipulation of a control knob 71 to control the sweep speed of the irrigation system over the ground. This adjustment mechanism varies the time period or duration for which the valve assumes the third or neutral position, during which the system is at rest and idle. By decreasing the duration of the valve third position, the sweep speed of the irrigation system is accordingly increased.

The shut-off valve 65 and check valve 67 arrangement combine to prevent incomplete stroking of the cylinder by normally retaining the cylinders in a fully extended position. As best illustrated in FIG. 4, when the electric timer 54 places the valve 53 in the first position, the pump 47 is communicated with the power manifold 45, thereby placing hydraulic pressure on the power side 43 of each of the cylinder pistons and releasing the pressure on the retract cylinder side 44. If the shut-off valve 65 is open, as shown in the uppermost cylinder of FIG. 4, the hydraulic fluid will flow therethrough and force the piston to a fully extended position. Even if the shut-off valve 66 is closed, the check valve 67 allows the hydraulic fluid to flow therethrough into the power side 43 of the cylinder piston, as shown in the center cylinder in FIG. 4, and force the same to a fully extended position. After the duration of the first valve position is over, the electric timer 54 switches the valve to the third or neutral position, wherein the hydraulic fluid flows substantially unrestricted through the pressure and return lines 48 and 49. The neutral valve position allows the hydraulic fluid to cool for extended operating life of both the sprinkler equipment and the fluid. Also, by interrupting hydraulic fluid flow and pressure in the power and retract manifolds with the neutral position at the beginning of each power and retract stroke, the pressure in the manifolds is very low and the pump gradually brings the selected manifold up to pressure. This gradual pressuring of the manifolds contributes to the efficiency of the system and an extended operating life for the pump, lines, and other sprinkler equipment. As previously noted, the duration of the neutral valve position is slected in accordance with the desired sweep speed of the system, and may be in the nature of 10–40 seconds but should not be reduced to such a short time period which will allow the system to overheat. In the above noted example, a minimum neutral position duration of two seconds is preferred. After the valve neutral position, the electric timer 54 then switches the valve to the second position, wherein the pump 47 is communicated with the retract side 44 of each of the cylinders, and the pressure sides of the cylinders are communicated with the reservoir 56. If the vehicle is still out of alignment with the adjacent vehicles, the alignment mechanism retains the shut-off valve 65 in the open position, as illustrated in the uppermost cylinder, of FIG. 4, wherein pressurized fluid is applied to the retract side 44, and the fluid in the power side 43 is displaced through the power manifold 45 and valve 53 into the return line 49. If the vehicle is in alignment with the adjacent vehicles, the alignment mechanism will cause the shut-off valve 65 to remain in the closed position, such as shown in the middle cylinder shown in FIG. 4. Although the hydraulic pressure is applied to the return side 44 of such a cylinder, the closed shut-off valve 66 and check valve 67 prevent the hydraulic fluid from vacating the power side 43 of the cylinder, thereby retaining the cylinder piston in the fully extended position. Because the vehicle does not translate during the retract stroke of the cylinder, the shut-off valve 65 will not change positions during the stroke so as to cause a short stroke. If the shut-off valve 66 is open during the beginning of the retract cycle, the cylinder will fully retract. If the shut-off valve 66 is closed at the beginning of the retract cycle, as illustrated in the lowermost cylinder shown in FIG. 4, the cylinder will remain fully extended. In this manner, the shut-off valve and check valve arrangement prevents incomplete stroking of the cylinders, thereby preventing lost motion, severe vehicle misalignment and/or damage to the water pipe structure.

It is to be understood that while we have illustrated and described certain forms of our invention, it is not to be limited to the specific forms or arrangement of parts herein described and shown.

What we claim and desire to secure by Letters Patent is:

1. In a hydraulically driven center pivot irrigation system having a plurality of water pipe support vehicles each with a selectively double acting hydraulic cylinder mounted thereon for moving the vehicles over the ground, said vehicles being substantially radially aligned outwardly from a pivotal water source whereby the rates of speed with which said vehicles move increases proportionally with the respective distances said vehicles are spaced from said water source, and including means aligning the vehicles, a pump having a pressure line and a return line, a power manifold interconnecting a power side of each of the cylinders, and a retract manifold interconnecting a retract side of each of the cylinders, the improvement of a control device for said system comprising:
   (a) a hydraulic valve having:
      (1) a first position communicating the pressure line with the power manifold, and the return line with the retract manifold; and
      (2) a second position communicating the pressure line with the retract manifold, and the return line with the power manifold;
   (b) switching means operably connected with said hydraulic valve and regularly sequencing the same between said first and second positions;
   (c) a plurality of shut-off valves connected between one side of an associated one of said hydraulic cylinders and its respective power manifold, each of said shut-off valves including a controller spool connected with and manipulated by said vehicle aligning means and being adapted for maintaining said vehicles in substantial alignment radially outwardly from said pivotal water source by selectively controlling the flow of hydraulic fluid between one side of each of said hydraulic cylinders and its respective power manifold; and
   (d) a plurality of check valves connected between the power side of an associated one of said cylinders and the power manifold in a parallel relationship with said shut-off valve; each of said check valves permitting fluid flow from said power manifold to the associated cylinder when said hydraulic valve is in said first position thereby preventing incomplete power side stroking of the cylinder and preventing fluid flow in an opposite direction when said hydraulic valve is in said second position thereby preventing retraction of the cylinder unless the associated shut-off valve is in an open position.

2. A device as set forth in claim 1 wherein:
   (a) said timer includes a first adjustment means varying the time period said valve assumes the third position for controlling the sweep speed of the irrigation system over the ground.

3. A device as set forth in claim 2 wherein:
   (a) said timer includes a second adjustment means varying the time period said valve assumes the first and second positions, and being independent of said third valve time period.

4. A device as set forth in claim 1 wherein:
   (a) said valve includes solenoid means positioning said valve in said first and second positions, and resilient means automatically returning said valve to a third position communicating the pressure line with the return line upon deactivation of said solenoid means.

5. A control device as set forth in claim 1 including:
   (a) adjustment means connected with said timer and varying the time period for which said value assumes said first and second positions to insure full extension of each of said cylinders.

6. A system as set forth in claim 1 including:
   (a) a reservoir connected with said return line, and shaped for retaining hydraulic fluid therein; said pump being connected with said reservoir, drawing hydraulic fluid therefrom, pressurizing said hydraulic fluid, and communicating the same with the pressure line; and
   (b) a pressure relief valve connected in the pressure line between the pump and the valve, communicating with the reservoir and directing hydraulic fluid over a preselected pressure to the reservoir.

7. A device as set forth in claim 1 wherein:
   (a) said vehicle aligning means comprises a plurality of flexible lines, each of said lines having one end thereof connected with an associated controller spool, and another end thereof connected with a medial portion of the water pipe on a trailing side thereof between the associated vehicle and a radially, next-inwardly disposed vehicle.

8. A device as set forth in claim 7 including:
   (a) means adjusting the length of said flexible line for varying pipe alignment.

9. A device as set forth in claim 7 wherein:
   (a) tensile force is exerted along said flexible lines when said associated vehicle falls out of alignment with said radially, next-inwardly disposed vehicle and said controller spool opens said respective shut-off valve thereby allowing the flow of hydraulic fluid to the power side of the cylinder until said associated vehicle is substantially aligned with said radially, next-inwardly disposed vehicle and said tensile force is released.

10. In a center pivot irrigation system driven by a liquid hydraulic fluid other than irrigation water and having a plurality of water pipe support vehicles each with a selectively double acting hydraulic cylinder mounted thereon for moving the vehicles over the ground, said vehicles being substantially radially aligned outwardly from a pivotal water source whereby the rates of speed with which said vehicles move increases proportionally with the respective distances said vehicles are spaced from said water source, and including means aligning the vehicles, a pump having a pressure line and a return line, a power manifold interconnecting a power side of each of the cylinders, and a retract manifold interconnecting a retract side of each of the cylinders, the improvement of a control device for said system comprising:

(a) a hydraulic valve having:
  (1) a first position communicating the pressure line with the power manifold, and the return line with the retract manifold;
  (2) a second position communicating the pressure line with the retract manifold, and the return line with the power manifold; and
  (3) a third position communicating the pressure line with the return line;
  (4) solenoid means positioning said valve in said first and second positions, and resilient means automatically returning said valve to the third position upon deactivation of said solenoid means;
(b) a timer operably connected with said valve and regularly sequencing the same through a repeating cycle comprising, in seriatim, the first position, the third position, the second position, and the third position, whereby between the application of pressurized hydraulic fluid to each of the cylinder sides the hydraulic pressure in said power and retract manifolds decreases, said hydraulic pressure thereby increasing gradually when said valve is in said first and second positions, and whereby between the application of pressurized hydraulic fluid to each of the cylinder sides the control device places the system in a neutral position wherein the hydraulic fluid flows substantially unrestricted therethrough without expending substantial work for reduced energy consumption, lower fluid temperature and extended operating life;
(c) a plurality of shut-off valves connected between one side of an associated one of said hydraulic cylinders and its respective power manifold, each of said shut-off valves including a controller spool connected with and manipulated by said vehicle aligning means and being adapted for maintaining said vehicles in substantial alignment radially outwardly from said pivotal water source by selectively controlling the flow of hydraulic fluid between one side of each of said hydraulic cylinders and its respective power manifold; and
(d) a plurality of check valves connected between the power side of an associated one of said cylinders and the power manifold in a parallel relationship with said shut-off valve; each of said check valves permitting fluid flow from said power manifold to the associated cylinder when said hydraulic valve is in said first position thereby preventing incomplete power side stroking of the cylinder and preventing fluid flow in an opposite direction when said hydraulic valve is in said second position thereby preventing retraction of the cylinder unless the associated shut-off valve thereof is in an open position.

* * * * *